Nov. 16, 1965 P. W. SCHAFF 3,218,079

RECORD CHANGER

Filed March 14, 1962

INVENTOR
PAUL W. SCHAFF

United States Patent Office 3,218,079

Patented Nov. 16, 1965

3,218,079

RECORD CHANGER

Paul W. Schaff, Arlington Heights, Ill., assignor to Warwick Electronics Inc., a corporation of Delaware Filed Mar. 14, 1962, Ser. No. 179,680
4 Claims. (Cl. 274—10)

This invention relates to a record changer with a record balancer and, more particularly, to a record balancer which aids to prevent unnecessary wear or damage to the records.

In standard record changers having a spindle extending upwardly from a turntable, a shoulder is provided upon which the record stack rests. This results in shifting the center of gravity of a record to a position offset from the point of support of a record on the shoulder, with the result that a record tends to wobble around on the shoulder and assume a tilted position. This results in the high edge of the tilted record engaging against and likely scratching the playing grooves of a second record being placed on the spindle. This tilting can also occur when a relatively few records are initially placed on the spindle. It is also possible that the lowermost record can be jarred off the shoulder and fall onto the turntable.

Accordingly, an object of this invention is to provide a new and improved method of stacking records on a spindle with means for balancing one or more records in a horizontal position on the spindle shoulder.

Another object of the invention is to provide means for balancing records stacked individually one at a time, rather than loading a whole stack at once, with each record being balanced horizontally, making it easier to handle the record due to the avoidance of any tendency of a record to wobble or tilt which reduces finger marks on the playing grooves as well as scratches or dirt which would result in surface noise.

A further object of the invention is to provide a record balancing arm which is located in a position to support records during loading of the spindle and which is connected to a component of the changer for movement to an out-of-the-way position during a record change cycle.

Still another object of the invention is to provide a record balancing arm located to also function as a size sensing member to sense the size of a record during the record change cycle to control the set-down position of the tone arm.

Further objects and advantages will become apparent from the following detailed description taken in connection with the accompanying drawings in which.

Figures 1, 2, 3:
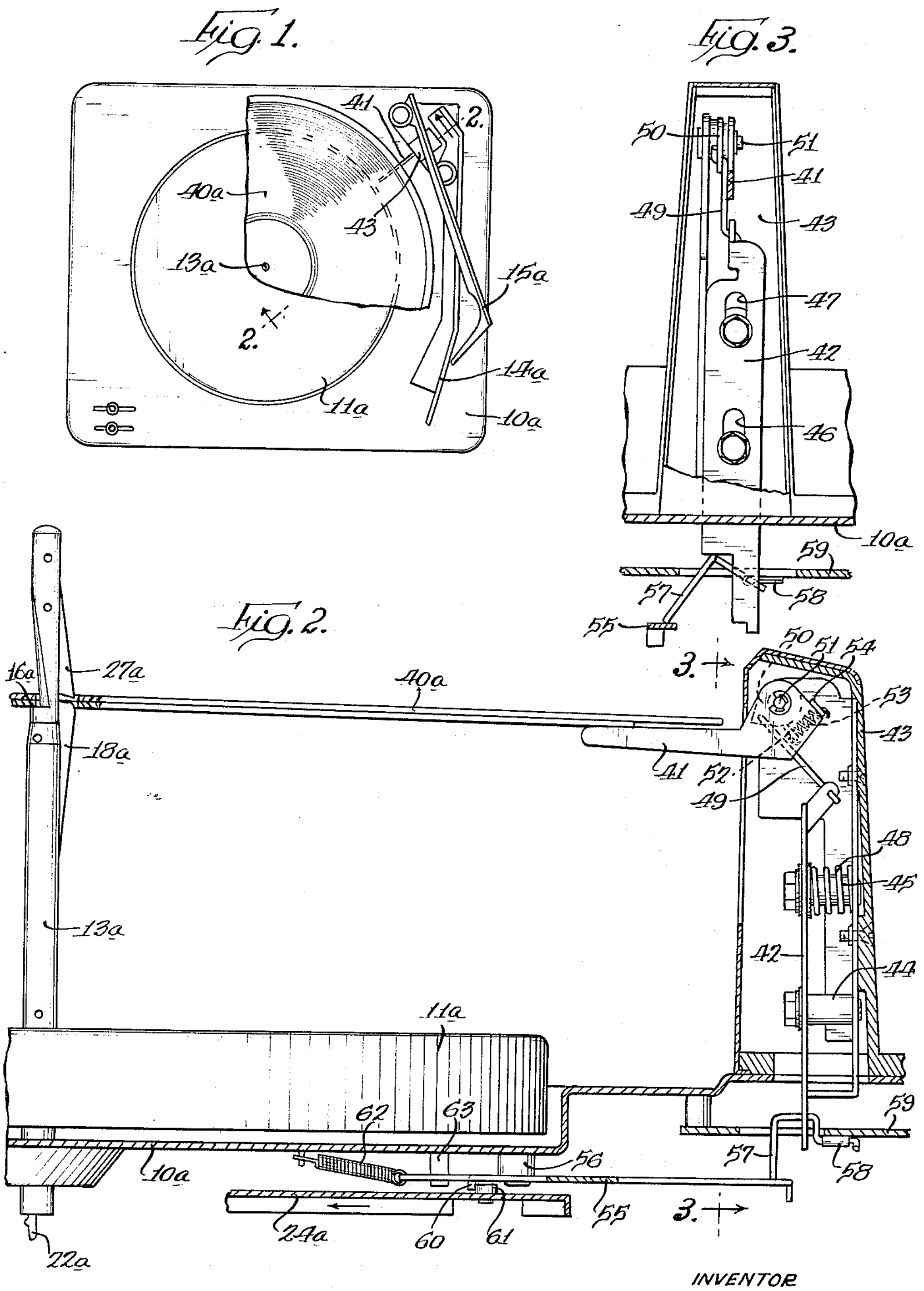
FIG. 1 is a plan view of a record changer embodying a preferred embodiment of the invention with a record stack shown broken away.
FIG. 2 is a vertical section on an enlarged scale taken generally along the line 2—2 in FIG. 1.
FIG. 3 is a vertical view taken generally along the line 3—3 in FIG. 2 and with parts of a housing broken away.

While this invention is susceptible of embodiment in many different forms, there is shown in the drawings and will herein be described in detail an embodiment of the invention, with the understanding that the present disclosure is to be considered as an exemplification of the principles of the invention and is not intended to limit the invention to the embodiment illustrated. The scope of the invention will be pointed out in the appended claims.

In the illustrated embodiment, a record changer has a motorboard 10a which rotatably mounts a turntable 11a by known means with a centrally located stationary spindle 13a extending upwardly from the turntable. As is known in the art, the motorboard movably mounts a tone arm 14a and a record hold-down member 15a which is movable from the position shown in FIG. 1 to a position yieldably resting upon the upper side of a stack of records to hold the records on the spindle 13a in a known manner.

The spindle 13a is provided with a record stack supporting shoulder or shelf 16a upon which the lowermost record of a record stack may rest. An ejector lever 18a is mounted for pivotal movement, as well as up and down movement, in spindle 13a; and a spring (not shown) engages the lower end 22a of the ejector lever to urge the upper end of the ejector lever into the central hole of the lowermost record in the record stack. The lever 18a is pivoted by a movable part 24a of the change cycle mechanism of the record changer, which is moved through a cycle in a known manner. Pivotal movement of the ejector lever 18a shifts the lowermost record in the record stack off of the spindle shoulder, and aligns it with the lower part of the spindle so that the record can move down onto the turntable 11a. As is well known in the art, succeeding records in the stack are caused to move down onto the spindle shoulder by means of a slide member 27a mounted in the upper part of the spindle and which is movable to a position within the spindle when a record stack is being removed from the turntable along the spindle. Due to the support of a record on the shoulder at one side of the central hole thereof, the center of gravity of a record is offset. This can result in a record moving to a tilted position when one or only a few records are supported on the spindle during loading, and the hold-down member 15a is withdrawn.

In order to prevent this, a balance arm, indicated at 41, faces the non-shouldered side of the spindle 13a in order to support the records 40a at the side of the record center of gravity opposite from the location of engagement of a record by the shoulder 16a. The balance arm also functions as a size sensing member for controlling the set-down position of the tone arm 14a by controlling the position of a vertically movable plate 42 mounted within a housing 43. The plate movably receives pins 44 and 45 in elongate slots 46 and 47, respectively. The plate 42 is held in a position of vertical adjustment by a spring brake 48 frictionally engaging the plate 42 with the positions of the plate being controlled from the arm 41 by a link 49 connecting to a collar 50 rotatable on a pin 51 and having an ear 52 connected by a spring 53 to an ear 54 on the arm 41.

The lower end of the plate 42 has steps formed thereon for coaction with a set-down cam associated with the tone arm so that the different levels of the plate 42 provide for different set-down positions of the tone arm.

Records are placed on the spindle 13a normally when the changer is not going through a change cycle and during this interval a lever 55 pivoted on the motorboard at 56 is positively held in a position of engagement with a wire member 57 to engage the slide 42 and hold the slide in its upper position. The wire member 57 is pivoted at 58 on a bracket 59 secured to the motorboard 10a. The lever 55 is held in the position shown by engagement of a turned down flange 60 thereon with a roller 61 carried on the change cycle mechanism 24a, with the lever 55 being urged by a spring 62 about its pivot 56 against a stop 63, when free to do so.

With the wire 57 engaged by the lever 55, the arm 41 is held in the position shown in the drawings whereby as one or several records are placed on the spindle shoulder 16, the arm 41 balances the records against tilting. This arm can freely swing upward to permit removal of a stack of records from the turntable, due to the loose pivotal mounting thereof on the pin 51 and the movement of ears 52 and 54 toward each other. In the event of excessive downward force on the arm 41, the spring 53 can stretch to permit the arm to move downwardly. When the record change cycle occurs, the lever 55 will be permitted to swing to free the wire 57, so that a record moving off the shoulder and onto the turntable can move the arm 41 downwardly to a position dependent upon the diameter of the record, with this movement resulting in corresponding downward movement of the plate 42 to coact with the set-down cam (not shown). The hold-down member 15*a* holds the stack level when in place.

With the support of ten and twelve-inch records by the balance arm 41 as shown in FIG. 2, it is readily apparent that balancing can be obtained for either size of record.

With the construction disclosed herein, it will be seen that a balance arm has been provided to assist in placing one or relatively few records on a spindle shoulder, without resultant tilting of the records, which has frequently resulted in records falling to the turntable or such tilted records interfering with subsequent records placed on the spindle. The balancing member is an arm which engages under a record to substantially prevent the tilting and which does not interfere with movement of a record from the spindle shoulder to the turntable or removal of one or more records from the turntable.

I claim:

1. A record changer comprising: a motorboard; a turntable mounted on said motorboard; a spindle extending upwardly from said turntable with a record supporting shoulder adapted to support a stack of records of varying size; means for ejecting the lowermost record in the record stack from the spindle shoulder during a record change cycle; a tone arm mounted on said motorboard for movement to an out of the way position adjacent said turntable during a record change cycle, and for movement to one of a plurality of set down positions after the lowermost record in the record stack has been lowered to the turntable, the set down position of said tone arm depending upon the size of the ejected record; record change cycle means for actuating said record ejecting means and for moving said tone arm; and a record size sensing and balancing mechanism for supporting a record placed on the spindle shoulder except during the record change cycle, and for sensing the size of the record when it is ejected from the spindle shoulder, said mechanism including a frame fixed to and upstanding from the motorboard, said frame being positioned to face the non-shoulder side of the spindle, an arm pivotally mounted on said frame at approximately the level of said spindle shoulder, a portion of said arm overlying said turntable beneath said record stack for movement of said arm by an ejected record between a generally horizontal record balancing position and one of a plurality of downwardly inclined positions depending upon the size of the ejected record, means operatively connected to said arm for indicating the downwardly inclined position of the arm in a record change cycle including a movable member connected to said arm and operatively responsive to movement of said arm for controlling the set down position of said tone arm, and means for blocking movement of the member and arm other than during a record change cycle including a changer element engageable with the member.

2. A record changer comprising: a motorboard; a turntable mounted on said motorboard; a spindle extending upwardly from said turntable with a record supporting shoulder adapted to support a stack of records of varying size; means for ejecting the lowermost record in the record stack from the spindle shoulder during a record change cycle; a tone arm mounted on said motorboard for movement to an out of the way position adjacent said turntable during a record change cycle, and for movement to one of a plurality of set down positions after the lowermost record in the record stack has been lowered to the turntable, the set down position of said tone arm depending upon the size of the ejected record; record change cycle means for actuating said record ejecting means and for moving said tone arm; and a record size sensing and balancing mechanism for supporting a record placed on the s pindle shoulder except during the record change cycle, and for sensing the size of the record when it is ejected from the spindle shoulder, said mechanism including a frame fixed to and upstanding from the motorboard, said frame being positioned to face the non-shoulder side of the spindle, an arm pivotally mounted on said frame at approximately the level of said spindle shoulder, a portion of said arm overlying said turntable beneath said record stack for movement of said arm by an ejected record between a generally horizontal record balancing position and one of a plurality of different positions depending upon the size of the ejected record, means operatively connected to said arm for indicating the moved position of the arm in a record change cycle including a movable member, spring means connecting said movable member to said arm whereby said member is operatively responsive to movement of said arm for controlling the set down position of said tone arm, and means for blocking movement of the member and arm other than during a record change cycle including a changer element engageable with the member, said spring means providing a safety release for downward movement of the arm but being sufficiently strong to support several records resting on said spindle shoulder.

3. A record changer comprising: a motorboard; a turntable mounted on said motorboard; a spindle extending upwardly from said turntable with a record supporting shoulder adapted to support a stack of records of varying size; means for ejecting the lowermost record in the record stack from the spindle shoulder during a record change cycle; a tone arm mounted on said motorboard for movement to an out of the way position adjacent said turntable during a record change cycle, and for movement to one of a plurality of set down positions after the lowermost record in the record stack has been lowered to the turntable, the set down position of said tone arm depending upon the size of the ejected record; record change cycle means for actuating said record ejecting means and for moving said tone arm; and a record size sensing and balancing mechanism for supporting a record placed on the spindle shoulder except during the record change cycle, and for sensing the size of the record when it is ejected from the spindle shoulder, said mechanism including a frame fixed to and upstanding from the motorboard, said frame being positioned to face the non-shoulder side of the spindle, an arm pivotally mounted on said frame at approximately the level of said spindle shoulder, a portion of said arm overlying said turntable beneath said record stack for movement of said arm by an ejected record between a generally horizontal record balancing position and one of a plurality of downwardly inclined positions depending upon the size of the ejected record, means operatively connected to said arm for indicating the downwardly inclined position of the arm in a record change cycle including a plate, means on said frame for supporting said plate for movement relative to said frame, linkage means connected to said plate, spring means connecting said linkage means to said arm whereby said plate is operatively responsive to movement of said arm for controlling the set down position of said tone arm, and means for blocking movement of the plate and arm other than during a record change cycle including a changer element engageable with the member, said spring means providing a safety release for downward movement of the arm but being sufficiently strong to support several records resting on said spindle shoulder.

4. A record changer comprising: a motorboard; a turntable mounted on said motorboard; a spindle extending upwardly form said turntable with a record supporting shoulder adapted to support a stack of records of varying size; means for ejecting the lowermost record in the record stack from the spindle shoulder during a record change cycle; a tone arm mounted on said motorboard for movement to an out of the way position adjacent said turntable durnig a record change cycle, and for movement to one of a plurality of set down positions after the lowermost record in the record stack has been lowered to the turntable, the set down position of said tone arm depending upon the size of the ejected record; record change cycle means for actuating said record ejecting means and for moving said tone arm; and a record size sensing and balancing mechanism for supporting a record placed on the spindle shoulder except during the record change cycle, and for sensing the size of the record when it is ejected from the spindle shoulder, said mechanism including a frame fixed to and upstanding from the motorboard, said frame being positioned to face the non-shoulder side of the spindle, an arm pivotally mounted on said frame at approximately the level of said spindle shoulder, a portion of said arm overlying said turntable beneath said record stack for movement of said arm by an ejected record between a generally horizontal record balancing position and one of a plurality of downwardly inclined positions depending upon the size of the ejected records, means operatively connected to said arm for indicating the downwardly inclined position of the arm in a record change cycle including a movable member, means loosely connecting said arm and said movable member including a spring connected therebetween and adapted to move said member as said arm moves from its balancing position to one of said inclined positions to control the set down position of said tone arm, means for blocking movement of the member and arm other than during a record change cycle including a changer element engageable with the member, said loose connection means permitting upward movement of said arm for removal of records from the turntable, and said spring providing a safety release for downward movement of the arm when said member is blocked but being sufficiently strong to support several records resting on said spindle shoulder.

References Cited by the Examiner

UNITED STATES PATENTS

| | | | |
|---|---|---|---|
| 2,637,558 | 5/1953 | Fisher | 274—10 |
| 2,794,647 | 6/1957 | Guest | 274—10 |
| 2,823,039 | 2/1958 | Collaro et al. | 274—10 |
| 2,925,280 | 2/1960 | Silbermann | 274—42 |

LOUIS J. CAPOZI, *Primary Examiner.*

ANTONIO F. GUIDA, *Examiner.*